United States Patent
Ruan et al.

(10) Patent No.: US 11,734,460 B2
(45) Date of Patent: Aug. 22, 2023

(54) CONNECTIONLESS TRUSTED COMPUTING BASE RECOVERY

(71) Applicant: Intel Corporation, Santa Clara, CA (US)

(72) Inventors: Xiaoyu Ruan, Folsom, CA (US); Tsippy Mendelson, Modiin (IL); Yanai Moyal, Jerusalem (IL); Daniel Nemiroff, El Dorado Hills, CA (US)

(73) Assignee: INTEL CORPORATION, Santa Clara, CA (US)

( * ) Notice: Subject to any disclaimer, the term of this patent is extended or adjusted under 35 U.S.C. 154(b) by 45 days.

(21) Appl. No.: 17/356,311

(22) Filed: Jun. 23, 2021

(65) Prior Publication Data

US 2021/0319139 A1 Oct. 14, 2021

Related U.S. Application Data

(60) Provisional application No. 63/164,989, filed on Mar. 23, 2021.

(51) Int. Cl.
*G06F 21/73* (2013.01)
*G06F 21/33* (2013.01)
*G06F 21/57* (2013.01)
*G06F 21/60* (2013.01)

(52) U.S. Cl.
CPC .............. *G06F 21/73* (2013.01); *G06F 21/33* (2013.01); *G06F 21/572* (2013.01); *G06F 21/602* (2013.01); *G06F 21/604* (2013.01)

(58) Field of Classification Search
CPC ........ G06F 21/73; G06F 21/33; G06F 21/572; G06F 21/602; G06F 21/604
See application file for complete search history.

(56) References Cited

U.S. PATENT DOCUMENTS

| | | | |
|---|---|---|---|
| 2008/0189545 A1* | 8/2008 | Parkinson | H04L 63/0823 713/158 |
| 2016/0142212 A1* | 5/2016 | Sarangdhar | H04L 9/3234 713/156 |
| 2016/0182238 A1* | 6/2016 | Dewan | H04L 9/321 713/193 |
| 2018/0091315 A1* | 3/2018 | Singhal | G06F 12/0238 |
| 2018/0145988 A1* | 5/2018 | Carson | H04L 9/0861 |
| 2018/0189194 A1* | 7/2018 | Halpern | G06F 21/64 |

(Continued)

FOREIGN PATENT DOCUMENTS

WO WO-2017050186 A1 * 3/2017

*Primary Examiner* — Shin-Hon (Eric) Chen
*Assistant Examiner* — Ethan V Vo
(74) *Attorney, Agent, or Firm* — Jaffery Watson Mendonsa & Hamilton LLP

(57) ABSTRACT

Connectionless trusted computing base recovery is described. An example of a system includes one or more processors to process data; hardware including a hardware RoT (root of trust); and firmware including a firmware TCB (trusted computing base), the firmware including the credentials including one or more certificates and one or more keys, wherein the one or more processors are to determine that the firmware TCB is compromised and that the hardware RoT is intact; issue new credentials by the hardware RoT to mutable firmware based on a version number or security version number (SVN) of the firmware; and revoke old versions of the credentials for the firmware.

21 Claims, 9 Drawing Sheets

(56) References Cited

U.S. PATENT DOCUMENTS

| | | | | |
|---|---|---|---|---|
| 2018/0351751 A1* | 12/2018 | Kumar | ............... | H04L 63/0823 |
| 2018/0375852 A1* | 12/2018 | Thom | ................ | H04L 63/0435 |
| 2019/0042725 A1* | 2/2019 | Ruan | .................... | H04L 9/3265 |
| 2019/0220602 A1* | 7/2019 | Ruan | ...................... | G06F 21/64 |
| 2020/0084202 A1* | 3/2020 | Smith | ............... | H04L 41/5003 |

* cited by examiner

| Level | Cert Name | Cert Serial Number | Private Key Derived From: | Private Key Derived By: | Private key user: | Signature is: | Revoke Upon: |
|---|---|---|---|---|---|---|---|
| 1 | ROM CA Cert | UMCHID (Unique) (See Note 1) | Chipset Key Fuse | Generated by Vendor, reassembled by ROM | ROM | Generated by Vendor, Burned in Fuses | Individual Part is Compromised (Private Key Published or Excessive Use of any Cert) (See Note 5) |
| 2 | Crypto CA Cert | Contains FW TCB SVN and Other Info; Same For All Platforms of a Product Line (See Note 2) | Chipset Key Fuse and FW TCB SVN | ROM | Crypto Driver | Generated by ROM, Output to Crypto Driver | When Bug found in FW TCB That Compromises Crypto Driver; Requires FW Update with FW TCB SVN Increment |
| 3 | App Certs | Contain App-SVN and FW SKU Info; Same For All Platforms of a Product Line (See Note 3) | Chipset key fuse and app-SVN | Crypto Driver | Crypto Driver | Generated by Crypto driver, Output to Application | When Bug Found in App FW; Requires Application FW Update with App-SVN Increment |
| 4 | Leaf Certs | Derivation of Subject Private Key – Unique Per Part | Chipset Key Fuse and App-Provided Salt | Crypto Driver | Application | Generated by Crypto Driver, Output to Application | Private key Compromised on Individual Parts |

Table 450

FIG. 4B

CONNECTIONLESS TRUSTED COMPUTING BASE RECOVERY

CLAIM TO PRIORITY

This application claims priority to U.S. Provisional Application Ser. No. 63/164,989, entitled CONNECTIONLESS TRUSTED COMPUTING BASE RECOVERY, by Xiaoyu Ruan, et al., filed Mar. 23, 2021, the entire contents of which are incorporated herein by reference.

TECHNICAL FIELD

Embodiments described herein generally relate to the field of electronic devices and, more particularly, connectionless trusted computing base recovery.

BACKGROUND

In modern computing device and system operation, security features include a trusted computing base (TCB), which is the set of all hardware, firmware, and software that combine to provide the device and system with a secure environment, including a hardware root of trust (RoT) that establishes a chain of trust that is required to ensure that the system or devices commences operation with legitimate code.

However, it is possible that one or more secure elements may be compromised by attack or other event. When a hardware root of trust is intact but the firmware trusted computing base of an embedded system is compromised, this generally means that the firmware trusted computing base must be recovered in the field with new credentials, and the compromised credentials must be revoked.

While existing solutions for trusted computing base recovery may be implemented, such solutions require operation of a backend server infrastructure. This infrastructure incurs substantial cost, and contributes to a larger overall system complexity and risk of delays or bugs in the trusted computing base recovery process.

BRIEF DESCRIPTION OF THE DRAWINGS

Embodiments described here are illustrated by way of example, and not by way of limitation, in the figures of the accompanying drawings in which like reference numerals refer to similar elements.

FIG. 4B is a table to illustrate characteristics of certificate levels with regard to connectionless trusted computing base recovery, according to some embodiments;

DETAILED DESCRIPTION

Figure 1:
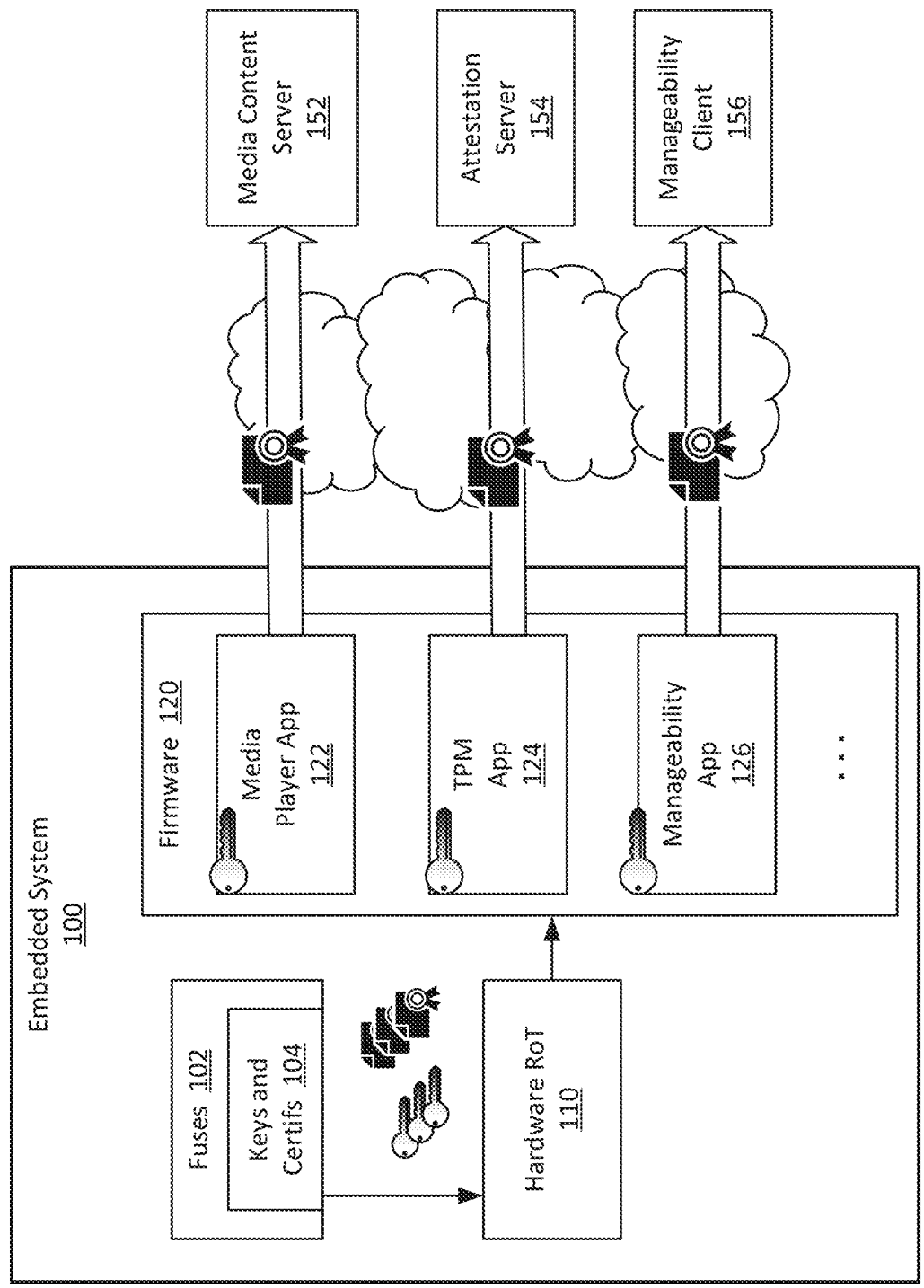
FIG. 1 illustrates an embedded system with sample applications using certificates for secure sessions with external verifiers, according to some embodiments.

Embodiments described herein are directed to connectionless trusted computing base recovery with on-die certificate authority.

When a hardware root of trust (RoT) is intact but the firmware trusted computing base (TCB) of an embedded system is compromised, the conventional technology for recovering the firmware trusted computing base is "connected" trusted computing base recovery. In such recovery, after new firmware that fixes the vulnerability is installed on a system in the field, the device or system is generally required to connect to the appropriate vendor's backend server, such as over the Internet, to retrieve new credentials.

More specifically, currently there are as many as four certificates that are generated by a vendor and signatures burned in platform controller hub (PCH) fuses. The number of certificates is increasing, and is not scalable because fuse space is limited and expensive. After firmware of an incremented security version number (SVN) is installed, the firmware connects to a trusted certificate service (TCS) server to retrieve a new key and certificate (such as EPID (Enhanced Privacy ID of Intel®) key/certificate) and request signing for new PTT (Platform Trust Technology) EK (Endorsement Key) certificates and general purpose (GP) certificate. This process is referred to in general as trusted computing base recovery.

In contrast, in some embodiments, the hardware root of trust serves as the on-die certificate authority (ODCA) and generates the firmware trusted computing base based on the firmware version or security version number, which completely removes the necessity for a connection for initial provisioning or recovery of the trusted computing base. In some embodiments, also provided is a simple revocation mechanism for revoking vulnerable trusted computing bases using a small certificate revocation list (CRL). The embodiment features a connectionless firmware update automatedly renewing the trusted computing base, and the revocation requires only one entry in a certificate revocation list to revoke a firmware version for all relevant parts.

Further, an embodiment is to fully comply and work with existing public key infrastructure (PKI) built upon X.509 and RFC5280 standards for public key certificates, without any new or proprietary certificate extensions and no new or proprietary certificate revocation mechanisms. Because of the compliance and reuse, the cost for deployment of an embodiment in an ecosystem is low.

Disadvantages of conventional solutions for trusted computing base recovery include the complexity and high cost incurred in several areas, such as:

Servers: High bandwidth and high capacity servers to support trusted computing base recovery of all systems in the field. For major vendors, the volume of impacted systems could be billions.

Engineering: Development and maintenance of required firmware and software agents. Application software and OS software is required to support connected trusted computing base recovery.

Bill of Materials (BOM): On-die fuses, flash, and memory for running these firmware and software components.

Customer engagement: Training for original equipment manufacturer (OEM) staff and integration with OEMs.

Another disadvantage is the deployment rate. For many devices, the connected trusted computing base recovery may not be possible, or may not happen even if possible, for various reasons, such as: a user is unaware of the process; proper software is unavailable or not installed; internet connectivity is not available due to security or operating environment restrictions; and so on.

In some embodiments, a novel apparatus, system, or process is built on on-die certificate authority (ODCA), with an embodiment to leverage existing PKI (public key infrastructure) and eliminate the need to maintain a trusted computing base recovery backend.

In some embodiments, a system includes a core connectionless and agentless feature: the system's hardware root of trust is to issue credentials to mutable firmware based on the version number or security version number (SVN) of the firmware running on the system, and the old versions' credentials are to be revoked. When being loaded, a newer version of firmware obtains new credentials from the hardware root of trust, without connection to the vendor's backend server through firmware/software agents. The credentials for older firmware are identified by their firmware versions or security version number and revoked by the vendor in a certificate revocation list.

Vendors experience the difficulty and cost of connected trusted computing base recovery through the vendor process for fixing vulnerabilities, releasing firmware patches, and re-issuing new firmware credentials to devices in the field. In an embodiment this problem is addressed by eliminating the connected trusted computing base recovery infrastructure, including servers, firmware, software, bill of materials, original equipment manufacturer (OEM) engagement, etc. Moreover, because no action or connection is needed after firmware update in connectionless recovery, the embodiment technology can ensure that systems running the latest firmware are recovered. An embodiment can not only save great financial costs, but can also increase trusted computing base recovery deployment rate towards complete compliance, thus ensuring that platforms are more robust and secure.

In some embodiments, the immutable root of trust of an embedded system is implemented in hardware and this loads the firmware stack. Embedded systems, such as, for example, CSME (Converged Security and Manageability Engine) and GSC (Graphics Security Controller) of Intel Corporation, PSP (Platform Security Processor) of AMD (Advanced Micro Devices, Inc.), and Pluton of Microsoft Corporation implement applications such as movie playback and embedded trusted platform module (TPM). An application possesses a private key and corresponding certificate issued by the vendor's certificate authority (CA) to communicate with external verifiers and perform its functionality. In a particular example, a media player application authenticates to a providing server (verifier), and requests movie encryption keys. The server sends movie encryption keys to the application only after successfully verifying that the application's certificate is rooted to a trusted vendor's CA, i.e., it is from a genuine hardware platform.

FIG. 1 illustrates an embedded system with sample applications using certificates for secure sessions with external verifiers, according to some embodiments. As shown in FIG. 1, an embedded system 100 includes fuses 102 that may be set in connection with secure operation, including keys and certificates 104 (which may be referred to together as credentials). The keys and certificates 104 are received by the hardware root of trust (RoT) 110, and the hardware root of trust 110 passes the credentials to the applications when loading firmware 120. Firmware 120 may be stored in one or more non-volatile memory elements. The applications in this illustration may include, but are not limited to, a media player application 122, a trusted platform module (TPM) application 124, and a manageability application 126. The certificates are then utilized in connection with a media content server 152, an attestation server 154, and a manageability client 156.

Figure 2:
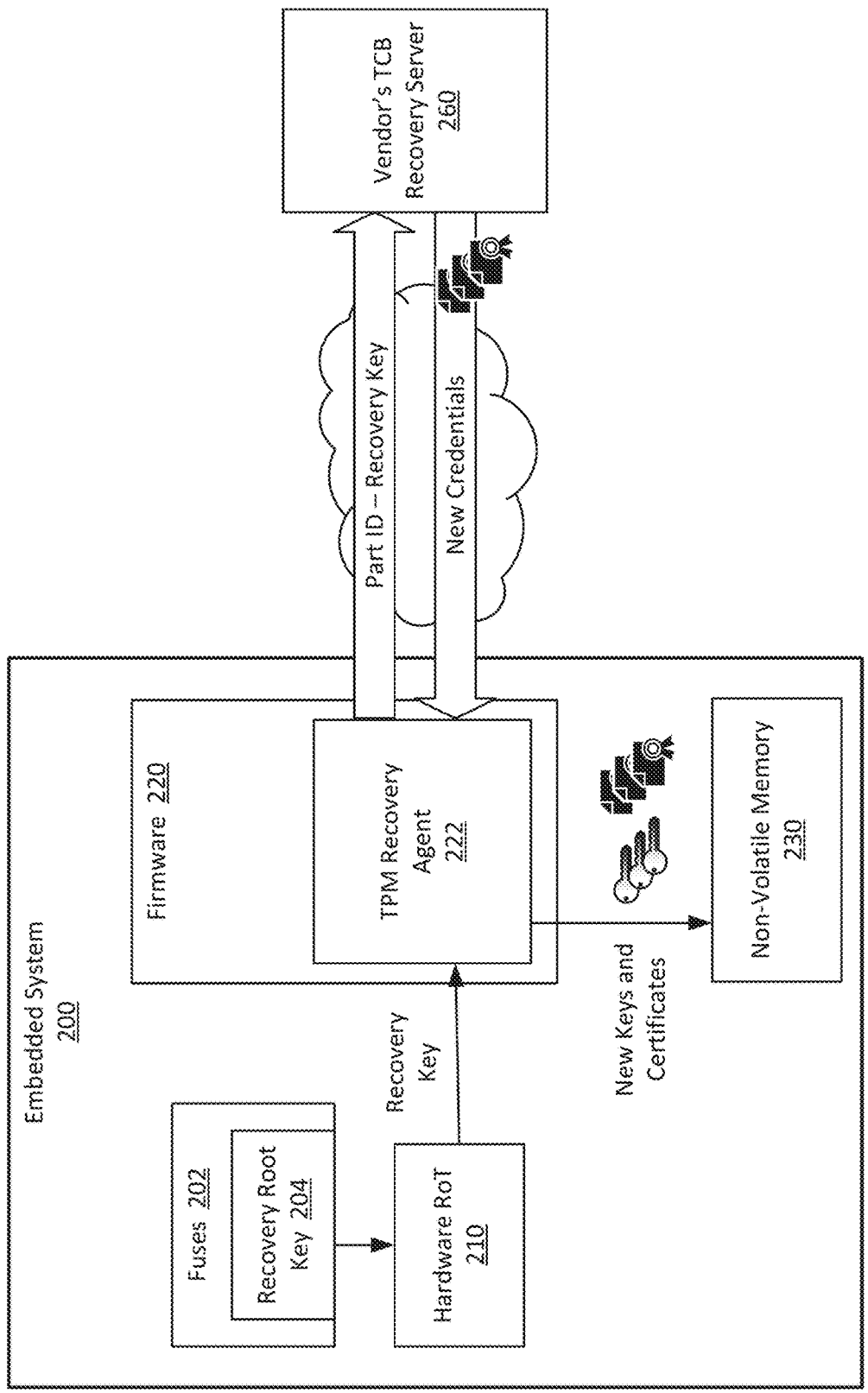
FIG. 2 illustrates a current technology for connected trusted computing base recovery.

Initial private keys and certificates are provisioned in a device's fuses during manufacturing. When the trusted computing base (including the application's private key) for one or more applications is compromised due to firmware vulnerabilities, the system must recover its trusted computing base in the field, which conventionally requires connection to a backend server, as illustrated in FIG. 2. In some embodiments, the embedded system instead implements connectionless trusted computing base recovery with on-die certificate authority to eliminate the need to maintain a trusted computing base recovery backend, as further described here.

FIG. 2 illustrates a current technology for connected trusted computing base recovery. Upon the firmware trusted computing base of an embedded system 200 being compromised, conventional technology generally requires that new firmware connect to the backend recover server to retrieve new credentials. As seen in FIG. 2, the hardware root of trust 210 of the embedded system 200 reads from fuses 202 a secret, recovery root key 204, which is provisioned by the vendor and pre-shared with the vendor's trusted computing base recovery server 260. As further illustrated, the embedded system includes firmware 220 including a trusted platform module recovery agent 222, a non-volatile memory 230 to receive keys and certificates, and a link for connection to the vender's trusted computing base recover server 260. Firmware 220 may be stored in one or more non-volatile memory elements.

In recovery, the new firmware patches bugs in older firmware but it does not install new keys or certificates. After the firmware 220 is updated, a recovery operation must be triggered by the end user or an application that failed authentication to the verifier using its old credential. Once triggered, the trusted computing base recovery process connects to the vendor's trusted computing base recovery server 260 via a software agent, presents its unique part ID and the matching recovery key (derived from recovery root key), and receives new credentials from the server 260. The trusted computing base recovery server 260 authenticates the relevant device (including embedded system 200) by looking up the presented part ID in its database and comparing the derived recovery key from the database with what is presented by the device. The trusted computing base recovery server 260 then sends new credentials to the device's embedded system 200. The device stores new keys and certificates in the non-volatile memory 230 for future use. The keys and certificates in fuses are deprecated.

In some embodiments, a novel solution repurposes the hardware root of trust's secret from a pre-shared secret to an asymmetric private key. The underlying cryptosystem can be ECC (Elliptic-Curve Cryptography), RSA (Rivest-Shamir-Adleman), or any other public-key cryptosystem. The relevant vendor's certificate authority endorses the private key by issuing a CA certificate to the hardware root of trust. The certificate is provisioned in the fuses alongside the private key. With a private key and corresponding CA certificate, the hardware root of trust acts as an on-die certificate authority (ODCA) and issues certificates to various firmware components. All applications' certificates are, through the on-die certificate authority, rooted to the vendor's certificate authority and hence trusted by verifiers.

Figure 3:
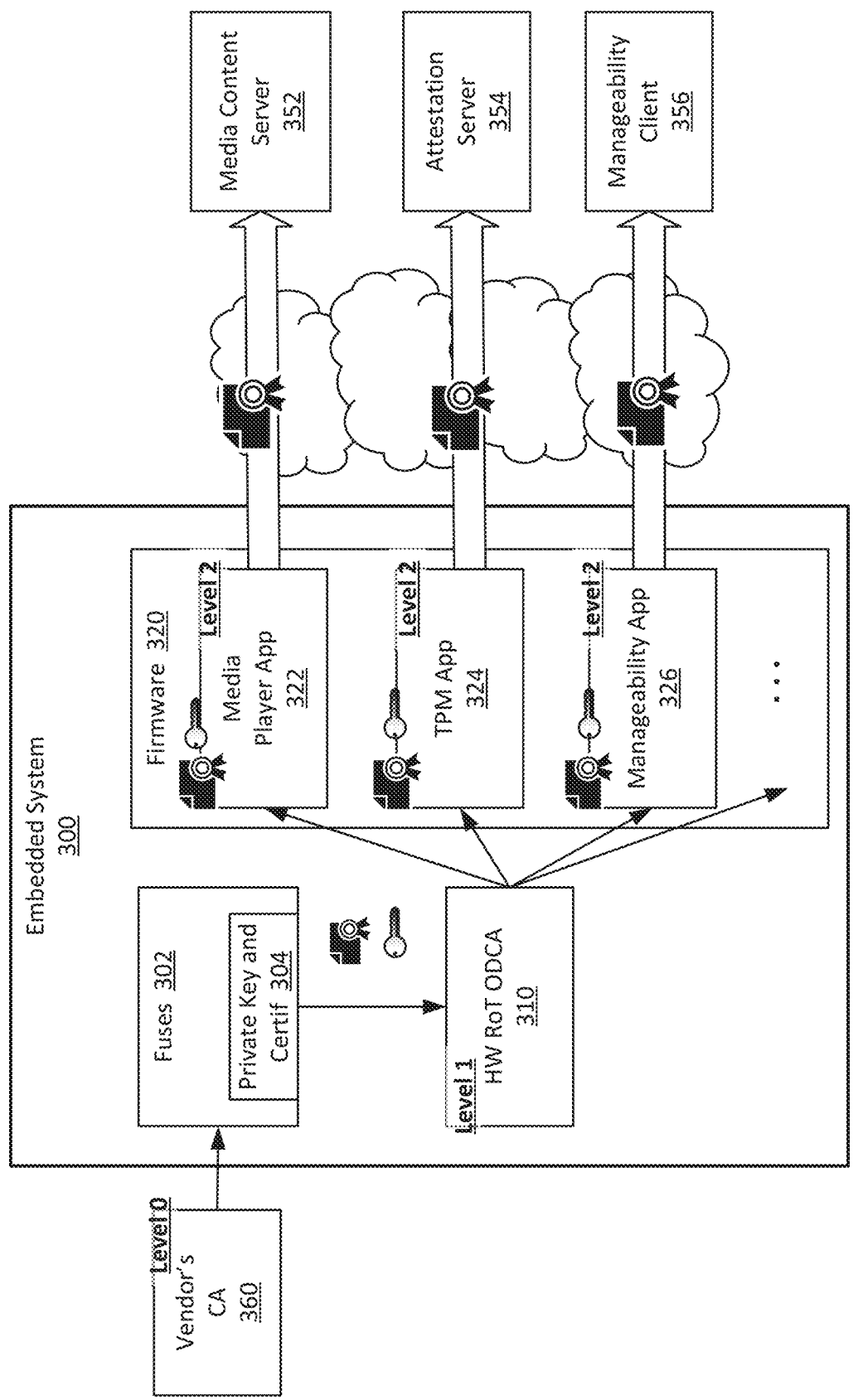
FIG. 3 illustrates a hardware root of trust issuing credentials to firmware applications for connectionless trusted computing base recovery, according to some embodiments.

FIG. 3 illustrates a hardware root of trust issuing credentials to firmware applications for connectionless TCB recovery, according to some embodiments. FIG. 3 depicts a general architecture for an embedded system, with further details for particular implementations being provided below. In some embodiments, the private keys and certificates at various levels are constructed as follows:

Level 0: Vendor's certificate authority root of trust 360. The vendor's certificate authority is trusted by and hard-coded in external verifiers.

Level 1: On-Die Certificate Authority—Hardware root of trust CA 310 (immutable) The hardware root of trust CA 310 receives private keys and certificate values 304 from fuses 302, as follows:

Private key: Unique per part, generated by vendor or the part itself (e.g., by on-die physically unclonable function (PUF)) and provisioned during manufacturing.

Certificate: Serial number is the unique part ID. Certificate is constructed and signed by vendor's certificate authority and provisioned in fuses during manufacturing.

Level 2: Firmware certificates. As shown, the firmware 320 includes multiple applications, the illustrated applications including a media player application 322, a trusted platform module application 324, and a manageability application, operating with a media content server 352, attestation server 354, and manageability client 356. The credentials are:

Private key: Generated by application or the on-die certificate authority 310.

Certificate: Serial number is made up of the firmware application ID and version number or security version number. The serial number is specific to firmware, not parts. Certificate is signed by the on-die certificate authority.

In some embodiments, a primary element in an apparatus, system, or process regards how the firmware certificates are constructed to facilitate connectionless trusted computing base recovery and efficient revocation. Specifically, the on-die certificate authority sets the serial number of a firmware certificate in a way that it contains the firmware application ID and application's version or security version number (SVN). Concatenation of application ID and version is one way to build the serial number, but embodiments are not limited to any specific implementation for serial number construction. Such serial number construction enables:

Connectionless recovery: Once the firmware version or SVN is updated, a new certificate will be issued to the firmware by the ODCA automatically. No external connection to vendor's backend is necessary.

Efficient revocation: Certificates issued to a vulnerable firmware version by all instances of the on-die certificate authority are identified by the same serial number and revoked with a single entry in certificate revocation list. Note that the size of the certificate revocation list may be very small because only one entry is required to revoke certificates of a firmware version or security version number on all devices.

In some embodiments, an additional benefit is enhanced privacy. An application may generate its own private key and ask the hardware root of trust to sign the corresponding public key, and therefore no one else (including the vendor or the hardware root of trust) knows its private key. Note that the X.509 PKI (public key infrastructure) standard requires that the serial number of a certificate issued by a specific certificate authority be unique. Thus, if the application randomly generates its private key, then the hardware root of trust should ensure that only one certificate is issued to a given version of the application. However, it is noted that X.509 is provided as only one example, and embodiments are not limited to this example. Embodiments are applicable to trusted computing base recovery of any certificate and PKI schemes, including X.509 PKI and other standard and proprietary PKIs.

In some embodiments, the on-die certificate can also be used to trace a part back to its original factory or manufacturing site. The Level 1 certificate is issued to an individual part by the vendor, and is unique per part as identified by the unique serial number. As such, it serves as an ID that can be used to trace the part back to the factory or manufacturing site. This also proves authenticity of the die.

Because of the flexibility of certificate chain hierarchy, numerous variants can be derived from the general architecture, e.g., by varying the length of the chain and/or numbers of children of intermediate certificate authorities. However, embodiments are not limited to any specific designs derived from the general architecture.

Figure 4A:
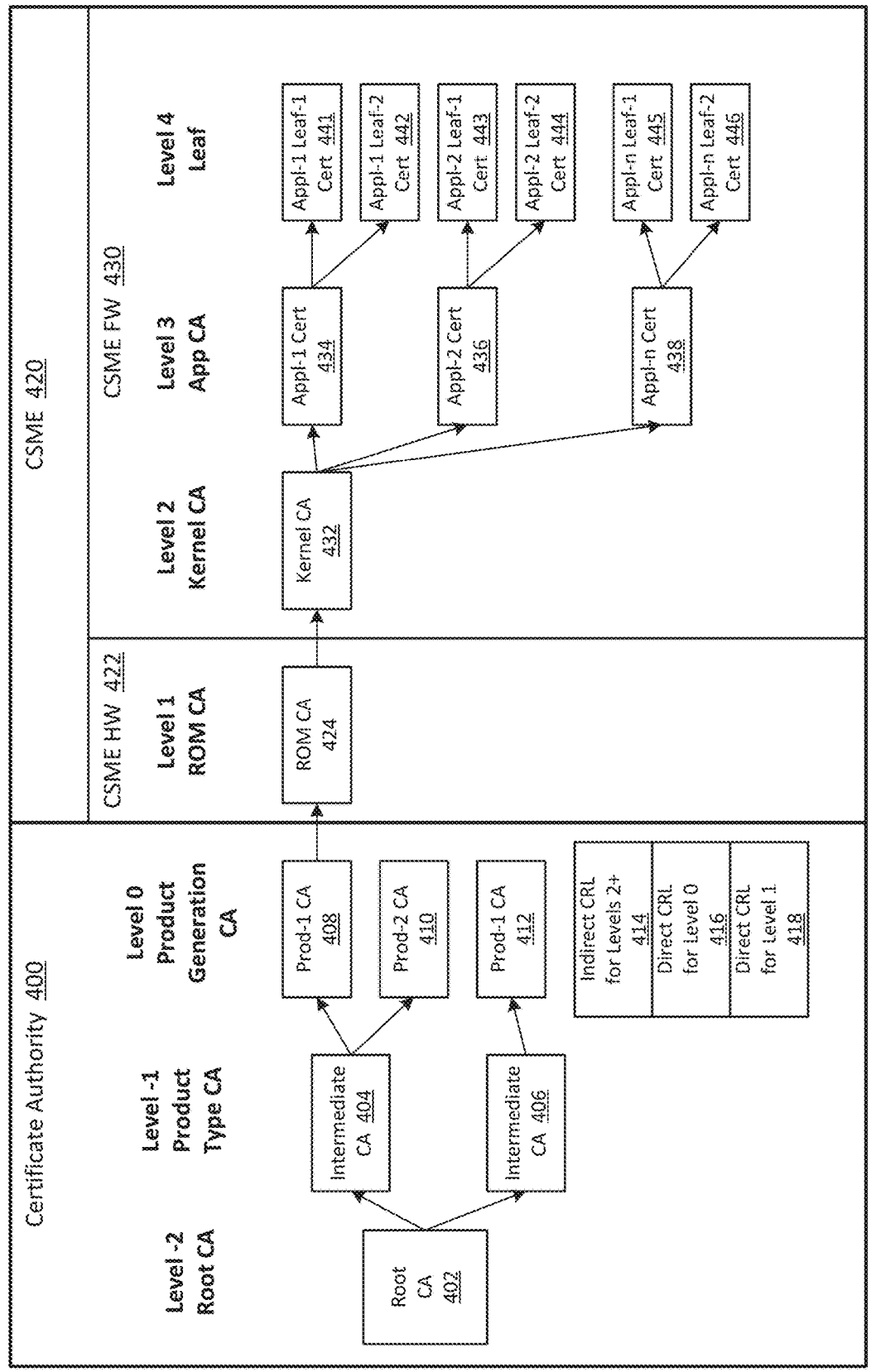
FIG. 4A is an illustration of an instantiation of connectionless trusted computing base recovery, according to some embodiments.

FIG. 4A is an illustration of an instantiation of connectionless trusted computing base recovery, according to some embodiments. FIG. 4B is a table 450 to illustrate characteristics of certificate levels with regard to connectionless trusted computing base recovery, according to some embodiments. FIGS. 4A and 4B illustrate an instantiation of connectionless trusted computing base recovery that minimizes hardware root of trust and enhances privacy. Illustrated in FIGS. 4A and 4B is a sample instantiation that minimizes the size of hardware root of trust and supports kernel recovery. A best practice for designing immutable hardware is to make it small to reduce risk. Letting the hardware root of trust certificate authority issue certificates for all firmware applications as described in the General Architecture may be deemed risky or infeasible in constrained environments. As illustrated in FIG. 4A, the certificates include:

In the certificate authority 400:
Root Certificate Authority 402 at Level −2 (Root).
Intermediate Certificate Authority 404 and 406 at Level −1 (Product Type).
Products Certificate Authority at Level 0 illustrated as Prod-1 CA 408 and Prod-2 CA 410 from intermediate CA 404, and Prod-1 CA 412 from intermediate CA 406. Also illustrated are the certificate revocation list operations for the levels, including indirect certificate revocation list operation for levels 2+ and direct certificate revocation list operation for Level 0 and Level 1.

In CSME hardware 422 of CSME (Converged Security and Management Engine) 420 (or other security management technology):
ROM CA 424 for Level 1 in CSME hardware 422 of CSME 420.

In CSME firmware 430 of CSME:
Kernel CA 432 (which may also be referred to as the Crypto CA) of Level 2. There is a private key, constant per kernel version for this part, generated by the hardware root of trust certificate authority. In a particular implementation for the certificate: Serial Number=Kernel Version, for all parts.
Application certificates at Level 3, illustrated as App-1 certificate 434, App-2 certificate 436, and continuing through App-n certificate 438 (where n is any positive integer). There is a private key, constant per kernel version for this part, generated by the firmware kernel certificate authority. In a particular implementation for the certificate: Serial Number=Application ID+Application Version, for all parts.

Application leaf certificates at Level 4, shown as application leaf certificates 441 through 446. There is a private key randomly generated by the application certificate, thus: Serial Number=Random.

Thus, a complete certificate chain in a particular instances consists of 5 or more certificates:

Levels −2 to 0: Certificate Authority 400 (vendor certificates). As illustrated, a root CA at Level 0 is specific to a product generation/stepping and signs all ROM CA certificates (level 1).

ROM CA Certificate (level 1): Issued by the product generation CA (such as vendor product generation CA key) to the ROM CA 424. The associated ROM private key is derived by ROM from the chipset key in security fuses and never exposed to outside of ROM (except in a fallback case). In this sense the ROM private key is like the "provisioning base key". The ROM keypair is immutable and it does not change with security version number.

Crypto CA (aka Kernel CA) Certificate (level 2): issued by the ROM to Crypto/Kernel CA. The ROM derives the Crypto CA's private key from the seed in security fuses and the firmware trusted computing base SVN, and uses the ROM's private key to sign the Crypto CA certificate. The Crypto CA's private key is output by the ROM to the Crypto driver. Note that the Crypto CA's keypair is determined by ROM and it changes with firmware trusted computing base SVN, i.e., after installing a new SVN firmware, a new Crypto CA's keypair will be generated. The older Crypto driver with smaller SVN is not able to access newer Crypto CA's private key. In other words, SVN firmware update automatically renews the Crypto CA's keypair without connection to a trusted certificate service (TCS) server.

App Certificate (level 3): Issued by the Crypto CA to individual apps. There can be multiple app certificates on the device.

Leaf Certificates under App Certificate (level 4): Issued by application certificate. An application may have additional certificates under its application certificate.

Table 450 in FIG. 4B illustrates and summarizes characteristics associated with levels 1-4 of the certificate chain, the table 450 describing for each such level the certificate serial number; where the private key is derived from; which element is to derive the private key; which element is the user of the private key; how the relevant signature is generated; and how revocation is imposed upon a security compromise.

The following notes relate to entries indicated in Table 450 in FIG. 4B:

Note 1: The ROM CA certificate's SN (serial number) is unique per part, so it is possible to revoke an individual part, if that part is believed to have been compromised. Signs of compromise nay include, for example, publishing of the private key and excessive use of the certificate.

Note 2: The Crypto CA certificate's SN contains the firmware trusted computing base SVN and other information. This implementation allows using a single entry in a certificate revocation list to revoke all Crypto CA certificates of that compromised SVN, at a trusted computing base recovery event. Note that trusted computing base SVN ranges from 1 to at most 31 in a particular architecture.

Note 3: The application certificate's SN contains the app's security version number and firmware SKU info. This design allows using a single entry in a certificate revocation list to revoke all application certificates of that compromised app-SVN.

Note 4: When an upper level CA certificate is revoked, all its descendant certificates are invalidated and need to be regenerated, i.e., the firmware must delete all application certificates generated by the previous SVN and regenerate them.

Note 5: An additional scenario is when an individual part's Crypto or application is compromised, i.e., there is no firmware bug, but an attacker is able to comprise Crypto private key or application private key of an individual device using physical or other means. Ideally, only that device's Crypto/application certificate would be revoked. However, a design may not allow so. In this case, the device's ROM CA certificate is revoked, and the device is killed. This is arguably beyond what is necessary, as other innocent/uncompromised applications are also revoked. However, the operation is a reasonable reaction because the device has been attacked.

The instantiation provided in FIGS. 4A and 4B may provide numerous advantages, such as:

The hardware root of trust is small and simple in that it issues only one certificate (kernel CA certificate).

Individual applications' trusted computing base may be recovered and revoked independently by placing the serial number/security version number of vulnerable application in the certificate revocation list.

The instantiation features privacy enhancement (leaf's random private key known only to the owning application) without enforcing one certificate per application version.

Conventional technology for trusted computing base recovery, which requires connection to vendor's back-end server, is currently widely deployed. However, it has proved very expensive and inefficient in practice.

Figure 5A:
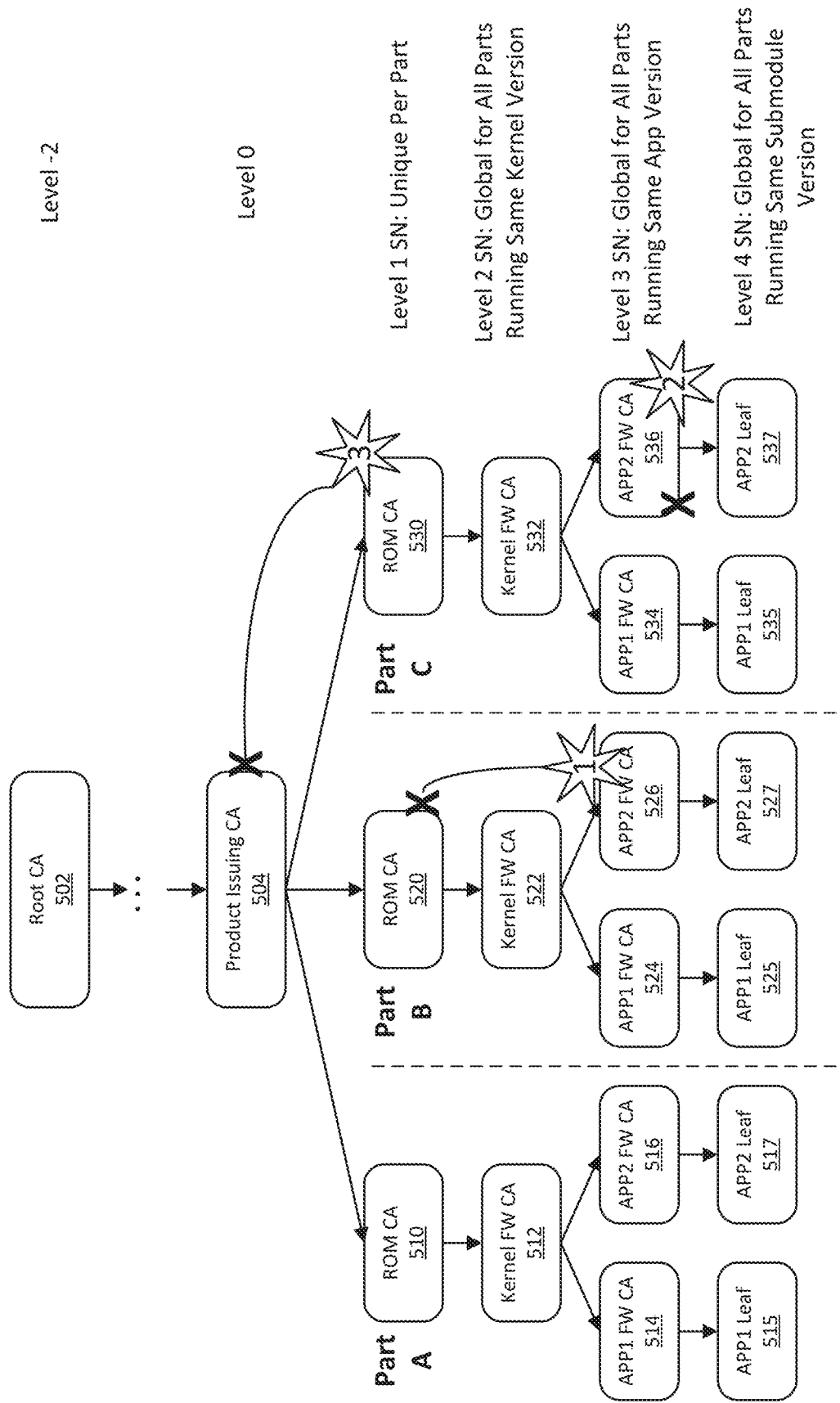
FIG. 5A is an illustration of apparatus compromise scenarios in connectionless trusted computing base recovery, according to some embodiments.

FIG. 5A is an illustration of apparatus compromise scenarios in connectionless trusted computing base recovery, according to some embodiments. As illustrated, an implementation may include a Root CA 502 at a root level (Level −2) and a Product Issuing CA 504 at a Level 0. Below these certificate levels there is a ROM CA at Level 1, which in this instance is illustrated as including ROM CA 510 in Part A, ROM CA 520 in Part B, and ROM CA 530 in Part C. Also illustrated are the respective Kernel Firmware CA 512, 522, and 532 at Level 2, App1 and App2 Firmware CA 514/516, 524/526, and 534/536 at Level 3; and App1 Leaf and App2 Leaf 515/517, 525/527, and 535/537 at Level 4. As indicated, the Level 2 serial numbers are unique per part; the Level 3 serial numbers are global for all parts running the same app version; and the Level 4 serial numbers are global for all parts running the same submodule version.

The potential compromise scenarios are the following:

Scenario 1: The private key of a Level 1+ certificate is compromised on an individual part, such as the illustrated ROM CA 520 of Part B and APP2 FW CA 526. In this scenario, there is no hardware or firmware vulnerability, and the compromised element is addressed by putting the ROM CA Serial Number of the relevant part on the CRL, thus revoking all levels' certificates of this part.

Scenario 2: The private keys of Level 2+ certificates are compromised on all parts due to a firmware vulnerability. In this scenario, the compromised parts are addressed by fixing the firmware bug of this level and releasing a patch, and putting the vulnerable firmware CA Serial Number on the CRL, thus revoking this firmware on all parts.

Scenario 3: The private keys of a Level 1 certificates are compromised on all parts due to ROM hardware vulnerability, as in the Product Issuing CA 504 at Level 0. In such scenario, the Product Issuing CA is placed on the CRL, thus resulting in a hardware recall scenario.

Figure 5B:
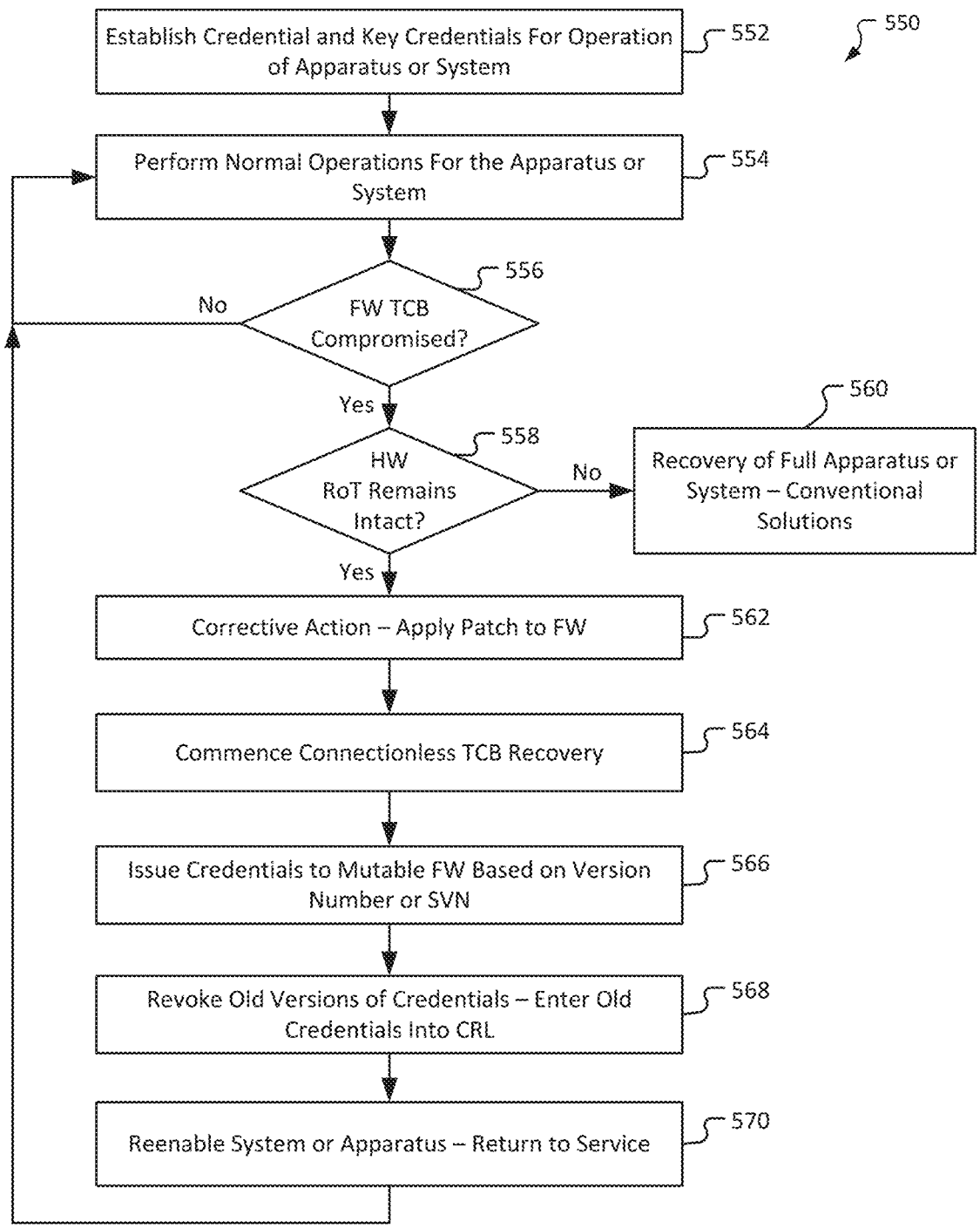
FIG. 5B is flowchart to illustrate a process for connectionless trusted computing base recovery, according to some embodiments.

FIG. 5B is flowchart to illustrate a process for connectionless trusted computing base recovery, according to some embodiments. In some embodiments, the embedded system instead implements connectionless trusted computing base recovery with on-die certificate authority to eliminate the need to maintain a trusted computing base recovery backend.

In a process 550, a system or apparatus is to establish certificate and key credentials for operation 552. Initial private keys and certificates are provisioned in device's fuses during manufacturing. In a certain implementation, the chain of certificates includes certificates as illustrated in FIG. 4A, the certificates being a Root CA at Level −2; one or more Intermediate CAs at Level −1 (Product Type); one or more Products CAs at Level 0; ROM CA at Level 1 in hardware; Kernel (Crypto) CA at Level 2; Applications CAs at Level 3; and Application leaves at Level 4. The apparatus or system is then to proceed with performance of normal operations for the system or apparatus 554.

During use of the system or apparatus, there may be a notice or determination that the firmware trusted computing base of the system or apparatus is compromised by an attack or other reason 556. If the hardware root of trust of the system or apparatus is not intact 558, then the recovery of the full system or apparatus may be addressed utilizing conventional solutions 560.

However, if the hardware root of trust is intact, the system or apparatus may proceed with performing necessary corrective action as needed 562 such as applying a required patch to firmware, and commencing connectionless trusted computing base recovery 564. In some embodiments, the hardware root of trust is to issue credentials to mutable firmware based on the version number or security version number (SVN) of the firmware running on the system 566. When being loaded, a newer version of firmware obtains new credentials from the hardware root of trust, without connection to the vendor's backend server through firmware/software agents.

In some embodiments, old versions of credentials are then revoked, with the credentials to be entered on the certificate revocation list (CRL) 568. The credentials for older firmware are identified by their firmware versions or security version number and revoked by the vendor in the certificate revocation list. As illustrated in FIG. 5B, the revocation operation is dependent on the individual scenario, and may include an individual part, all parts due to a firmware vulnerability, or all parts due to ROM hardware vulnerability.

Thus, the hardware root of trust serves as the on-die certificate authority (ODCA) and generates the firmware trusted computing base credentials based on the firmware version or security version number, which removes the necessity for a connection for initial provisioning or recovery of the trusted computing base. Further, the process 500 utilizes the simple revocation mechanism for revoking vulnerable trusted computing bases using a small certificate revocation list (CRL). The embodiment features a connectionless firmware update automatically renewing the trusted computing base, and the revocation requires only one entry in a certificate revocation list to revoke a firmware version for all relevant parts.

The system or apparatus can then be reenabled 570, and return to service to perform normal operations for the system or apparatus 554.

Figure 6:
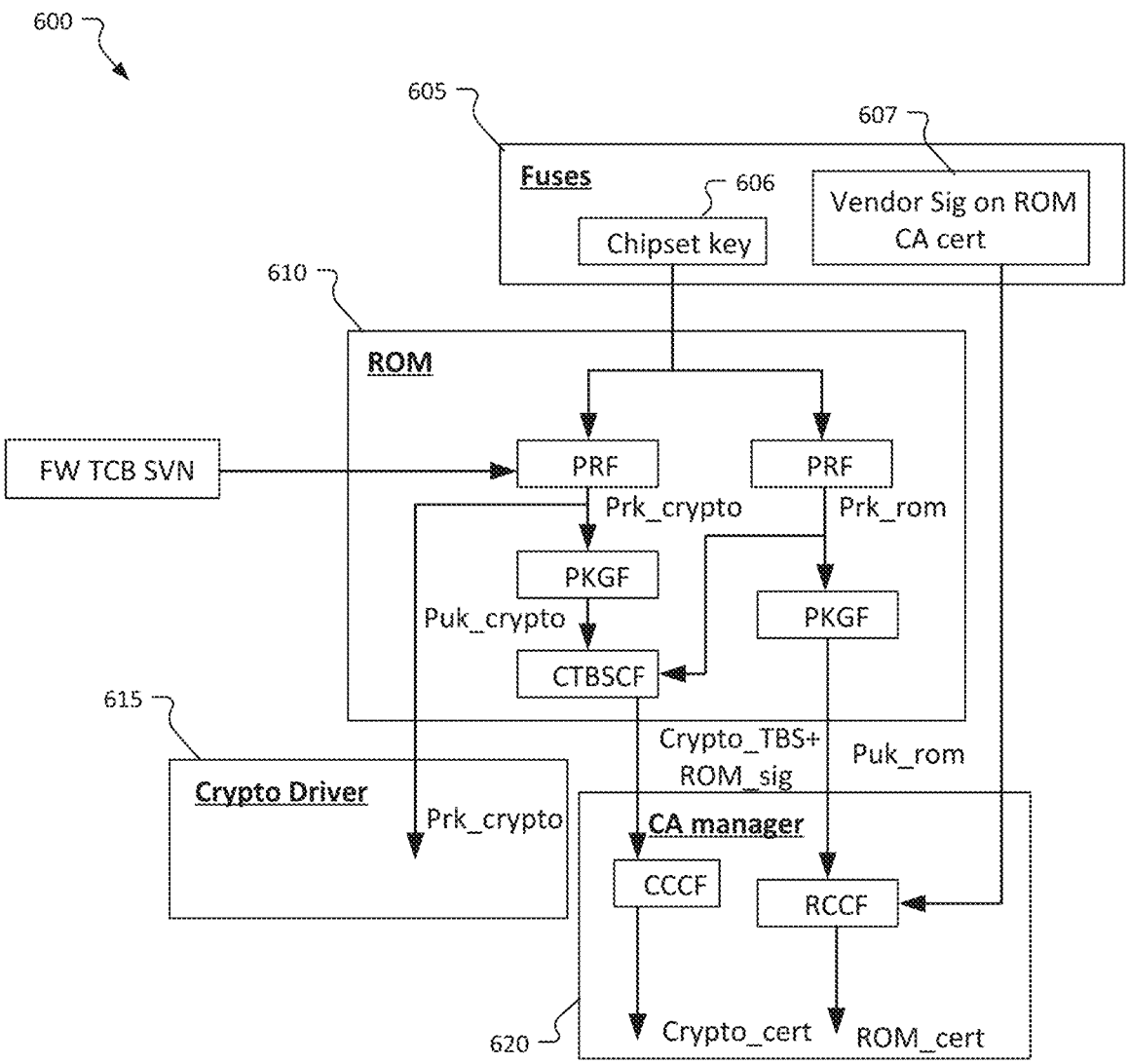
FIG. 6 is an illustration of ROM and firmware process flows for connectionless trusted computing base recovery, according to some embodiments.

FIG. 6 is an illustration of ROM and firmware process flows for connectionless trusted computing base recovery, according to some embodiments. As illustrated in FIG. 6, a computing apparatus or system 600 includes, but is not limited to, security fuses 605, including a chipset key 606 and the vendor's signature on ROM CA certificate 607; ROM (Read Only Memory) 610; a crypto driver 615; and a CA (Certificate Authority) manager in firmware 620.

ROM Flow: In a flow process, the ROM 610 reads DeriveOnDieCa variable from Non-Volatile Memory (NVM). If the variable is FALSE, then the ROM performs only Step (1) below. If variable is TRUE, then the ROM is to perform all Steps (1) to (5), and then is to set DeriveOnDieCa back to FALSE.

Step (1): The ROM 610 derives a ROM CA private key from the chipset key 606, such as using a PRF (pseudo random function) with HMAC-SHA384 per NIST 800-108.

Step (2): PKGF (Public Key Generation Function). The ROM 610 derives the ROM CA public key (Puk_rom) from the ROM CA private key Prk_rom. The formula is Puk_rom=Prk_rom*G. The ROM 610 passes Puk_rom to firmware to store in the OnDieCa partition in NVM.

Step (3): The ROM 610 derives the Crypto CA private key seed Prk_crypto_seed from the chipset key 606 and SVN. If and only if DeriveOnDieCa is TRUE, ROM also derives Crypto CA private key Prk_crypto. The ROM 610 is to pass the Prk_crypto_seed to Crypto driver firmware 615.

Step (4): ROM derives the Crypto CA public key Puk_crypto from the Crypto CA private key Prk_crypto by calculating Puk_crypto=Prk_crypto*G.

Step (5): CTBSCF (Crypto TBS construction function) for the Crypto CA certificate. The ROM 610 is to construct the Crypto CA certificate's TBS (to-be signed) region using a template, and sign it with Prk_rom. The internal function CTBSCF( ) takes FW SVN and Prk_rom as input, and outputs Crypto_TBS and ROM CA's signature ROM_sig (R, S) on TBS.

In summary, the ROM 610 may output 2 pieces of data:
(1) Prk_crypto_seed—This value is always output in all power cycles.
(2) Puk_rom+Crypto_TBS+ROM_sig (R, S)—This value is output only when OnDieCa partition is invalid.

If "Puk_rom+Crypto_TBS+ROM_sig" is received, a BUILD_CERTS function in CA manager is as follows:
(1) Run Step (7) to construct the ROM certificate from Puk_rom and per the template defined by vendor.
(2) Run Step (6) to construct the Crypto CA certificate from Crypto_TBS and ROM_sig (R, S).
(3) Calculate SHA256 of ROM_cert+Crypto_cert. (R, S).
(4) Store ROM_cert+Crypto_cert+SHA256 to OnDieCa partition on flash or other non-volatile memory.

Figure 7:
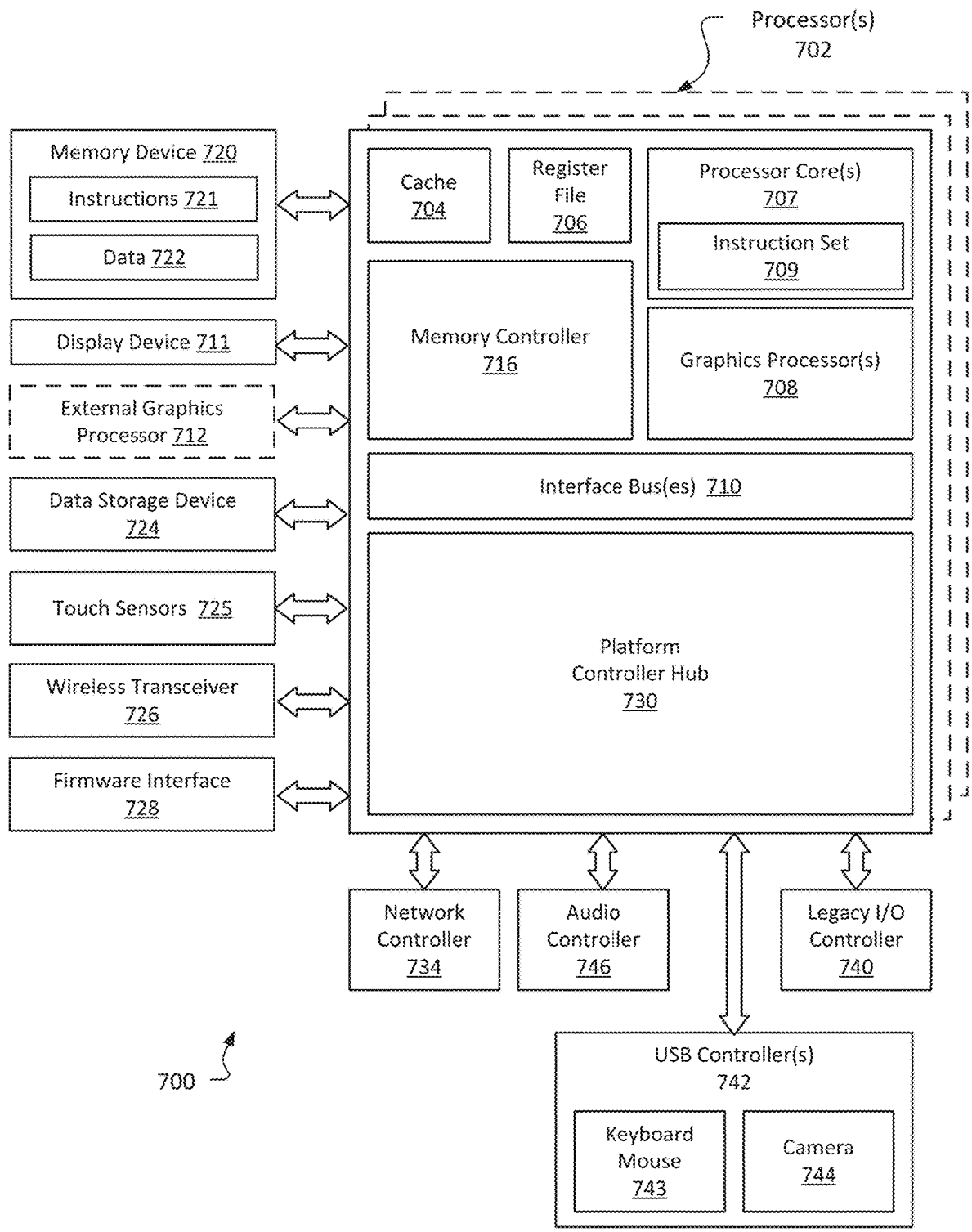
FIG. 7 illustrates an embodiment of an exemplary computing architecture for connectionless trusted computing base recovery, according to some embodiments.

FIG. 7 illustrates an embodiment of an exemplary computing architecture for connectionless trusted computing base recovery, according to some embodiments. In various embodiments as described above, a computing architecture 700 may comprise or be implemented as part of an electronic device. In some embodiments, the computing architecture 700 may be representative, for example, of a computer system that implements one or more components of the operating environments described above. The computing architecture 700 may be utilized to provide connectionless trusted computing base recovery, such as described in FIGS. 1-6.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive or solid state drive (SSD), multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes one or more processors 702 and one or more graphics processors 708, and may be a single processor desktop system, a multiprocessor workstation system, or a server system having a large number of processors 702 or processor cores 707. In one embodiment, the system 700 is a processing platform incorporated within a system-on-a-chip (SoC or SOC) integrated circuit for use in mobile, handheld, or embedded devices.

An embodiment of system 700 can include, or be incorporated within, a server-based gaming platform, a game console, including a game and media console, a mobile gaming console, a handheld game console, or an online game console. In some embodiments system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory 704 is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, one or more processor(s) 702 are coupled with one or more interface bus(es) 710 to transmit communication signals such as address, data, or control signals between processor 702 and other components in the system. The interface bus 710, in one embodiment, can be a processor bus, such as a version of the Direct Media Interface (DMI) bus. However, processor buses are not limited to the DMI bus, and may include one or more Peripheral Component Interconnect buses (e.g., PCI, PCI Express), memory buses, or other types of interface buses. In one embodiment the processor(s) 702 include an integrated memory controller 716 and a platform controller hub 730. The memory controller 716 facilitates communication between a memory device and other components of the system 700, while the platform controller hub (PCH) 730 provides connections to I/O devices via a local I/O bus.

Memory device 720 can be a dynamic random-access memory (DRAM) device, a static random-access memory (SRAM) device, non-volatile memory device such as flash memory device or phase-change memory device, or some other memory device having suitable performance to serve as process memory. Memory device 720 may further include non-volatile memory elements for storage of firmware. In one embodiment the memory device 720 can operate as system memory for the system 700, to store data 722 and instructions 721 for use when the one or more processors 702 execute an application or process. Memory controller hub 716 also couples with an optional external graphics processor 712, which may communicate with the one or more graphics processors 708 in processors 702 to perform graphics and media operations. In some embodiments a display device 711 can connect to the processor(s) 702. The display device 711 can be one or more of an internal display device, as in a mobile electronic device or a laptop device, or an external display device attached via a display interface (e.g., DisplayPort, etc.). In one embodiment the display device 711 can be a head mounted display (HMD) such as a stereoscopic display device for use in virtual reality (VR) applications or augmented reality (AR) applications.

In some embodiments the platform controller hub 730 enables peripherals to connect to memory device 720 and processor 702 via a high-speed I/O bus. The I/O peripherals include, but are not limited to, an audio controller 746, a network controller 734, a firmware interface 728, a wireless transceiver 726, touch sensors 725, a data storage device 724

(e.g., hard disk drive, flash memory, etc.). The data storage device 724 can connect via a storage interface (e.g., SATA) or via a peripheral bus, such as a Peripheral Component Interconnect bus (e.g., PCI, PCI Express). The touch sensors 725 can include touch screen sensors, pressure sensors, or fingerprint sensors. The wireless transceiver 726 can be a Wi-Fi transceiver, a Bluetooth transceiver, or a mobile network transceiver such as a 3G, 4G, Long Term Evolution (LTE), or 5G transceiver. The firmware interface 728 enables communication with system firmware, and can be, for example, a unified extensible firmware interface (UEFI). The network controller 734 can enable a network connection to a wired network. In some embodiments, a high-performance network controller (not shown) couples with the interface bus 710. The audio controller 746, in one embodiment, is a multi-channel high definition audio controller. In one embodiment the system 700 includes an optional legacy I/O controller 740 for coupling legacy (e.g., Personal System 2 (PS/2)) devices to the system. The platform controller hub 730 can also connect to one or more Universal Serial Bus (USB) controllers 742 connect input devices, such as keyboard and mouse 743 combinations, a camera 744, or other USB input devices.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

The following Examples pertain to certain embodiments:

In Example 1, a system includes one or more processors to process data; hardware including a hardware RoT (root of trust); and firmware including a firmware TCB (trusted computing base), the firmware having credentials including one or more certificates and one or more keys. wherein the one or more processors are to: determine that the firmware TCB is compromised and that the hardware RoT is intact; issue new credentials by the hardware RoT to mutable firmware based on a version number or security version number (SVN) of the firmware; and revoke one or more old versions of the credentials for the firmware.

In Example 2, the hardware root of trust serves as an on-die certificate authority (ODCA) and the new credentials are obtained from the hardware RoT without connection to a vendor's backend server.

In Example 3, revoking one or more old versions of the credentials for the firmware include entering the one or more old versions into a credential revocation list (CRL).

In Example 4, entering the one or more old versions into the CRL includes one of: for compromise of a private key of a certificate on an individual part, entering a serial number associated with the individual part into the CRL; for a compromise of all parts because of a firmware vulnerability, entering a serial number associated with the firmware in the CRL; or, for compromise of all parts due to a hardware vulnerability, entering a producing issuing certificate authority into the CRL.

In Example 5, credentials for the system include credentials issued for multiple levels.

In Example 6, the multiple levels include: read-only memory CA (Certificate Authority) credentials; kernel CA credentials; application credentials; and leaf credentials.

In Example 7, the multiple levels further include: root CA credentials; product type credentials; and product generation credentials.

In Example 8, the one or more processors are further to perform corrective action on the firmware.

In Example 9, the hardware RoT includes fuses to establish original credentials of the system.

In Example 10, credentials for the system are in compliance with a public key infrastructure (PKI) built upon X.509 and RFC5280 standards for public key certificates.

In Example 11, one or more non-transitory computer-readable storage mediums having stored thereon executable computer program instructions that, when executed by one or more processors, cause the one or more processors to perform operations including determining that firmware TCB (trusted computing base) of a computing system is compromised and that a hardware RoT (root of trust) of the computing system is intact; issuing new credentials by a hardware RoT (Root of Trust) of the computing system to mutable firmware of the computing system based on a version number or security version number (SVN) of firmware running on the system, the credentials including one or more certificates and one or more keys; and revoking one or more old versions of the credentials for the firmware.

In Example 12, revoking the one or more old versions of the credentials for the firmware include entering the one or more old versions into a credential revocation list (CRL).

In Example 13, entering the one or more old versions into the CRL includes one of: for compromise of a private key of a certificate on an individual part, entering a serial number associated with the individual part into the CRL; for a compromise of all parts because of a firmware vulnerability, entering a serial number associated with the firmware in the CRL; or, for compromise of all parts due to a hardware vulnerability, entering a producing issuing certificate authority into the CRL.

In Example 14, credentials for the system include credentials issued for multiple levels.

In Example 15, the instructions further include instructions for performing corrective action on the firmware.

In Example 16, a method includes determining that firmware TCB (trusted computing base) of a computing system is compromised and that a hardware RoT (root of trust) of the computing system is intact; issuing new credentials by a hardware RoT (Root of Trust) of the computing system to mutable firmware of the computing system based on a version number or security version number (SVN) of firmware running on the system, the credentials including one or more certificates and one or more keys; and revoking one or more old versions of the credentials for the firmware.

In Example 17, revoking the one or more old versions of the credentials for the firmware include entering the one or more old versions into a credential revocation list (CRL).

In Example 18, entering the one or more old versions into the CRL includes one of: for compromise of a private key of a certificate on an individual part, entering a serial number associated with the individual part into the CRL; for a compromise of all parts because of a firmware vulnerability, entering a serial number associated with the firmware in the CRL; or, for compromise of all parts due to a hardware vulnerability, entering a producing issuing certificate authority into the CRL.

In Example 19, credentials for the system include credentials issued for multiple levels.

In Example 20, the method further includes performing corrective action on the firmware.

In Example 23, an apparatus includes one or more processors to process data; one or more memory devices for storage of data for processing; and an embedded system including a hardware RoT (root of trust) including fuses to establish original credentials of the apparatus, and one or more non-volatile memory devices for storage of firmware including a firmware TCB (trusted computing base), the firmware having credentials including one or more certificates and one or more keys, wherein the one or more processors are to: determine that the firmware TCB is compromised and that the hardware RoT is intact; issue new credentials by the hardware RoT to mutable firmware based on a version number or security version number (SVN) of the firmware; and revoke one or more old versions of the credentials for the firmware.

In Example 22, the hardware root of trust serves as an on-die certificate authority (ODCA) and the new credentials are obtained from the hardware RoT without connection to a vendor's backend server.

In Example 23, revoking one or more old versions of the credentials for the firmware include entering the one or more old versions into a credential revocation list (CRL).

In Example 24, an apparatus includes means for determining that firmware TCB (trusted computing base) of a computing system is compromised and that a hardware RoT (root of trust) of the computing system is intact; means for issuing new credentials by a hardware RoT (Root of Trust) of the computing system to mutable firmware of the computing system based on a version number or security version number (SVN) of firmware running on the system, the credentials including one or more certificates and one or more keys; and means for revoking one or more old versions of the credentials for the firmware.

In Example 25, the means for revoking the one or more old versions of the credentials for the firmware include means for entering the one or more old versions into a credential revocation list (CRL).

In Example 26, the means for entering the one or more old versions into the CRL includes one or more of: means for entering a serial number associated with the individual part into the CRL for compromise of a private key of a certificate on an individual part; means for entering a serial number associated with the firmware in the CRL for a compromise of all parts because of a firmware vulnerability; or means for entering a producing issuing certificate authority into the CRL for compromise of all parts due to a hardware vulnerability.

In Example 27, credentials for the system include credentials issued for multiple levels.

In Example 28, the apparatus further includes means for performing corrective action on the firmware.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. A system comprising:
   one or more processors to process data;
   hardware including a hardware RoT (root of trust), wherein the hardware RoT includes:
      fuses to establish original credentials of the system, the original credentials including a chipset key and a certificate issued by a vendor certificate authority (CA), and
      a read-only memory (ROM) to derive a ROM CA private key based at least in part on the chipset key and to derive a public key based at least in part on the ROM CA private key; and
   firmware including a firmware TCB (trusted computing base), the firmware having credentials including one or more certificates and one or more keys;
   wherein the one or more processors are to:
      determine that the firmware TCB is compromised and that the hardware RoT is intact;
      issue new credentials by the hardware RoT for the firmware, wherein issuing the new credentials for the firmware includes setting a serial number of a firmware certificate to include an application ID of the firmware and a version number or security version number (SVN) of the firmware; and
      revoke one or more old versions of the credentials for the firmware and
   wherein the hardware RoT serves as an on-die certificate authority (ODCA), the hardware RoT to issue the new credentials for the firmware without utilizing a connection to a backend server of the vendor.

2. The system of claim 1, wherein revoking one or more old versions of the credentials for the firmware include entering the one or more old versions into a credential revocation list (CRL).

3. The system of claim 2, wherein entering the one or more old versions into the CRL includes one of:
   for compromise of a private key of a certificate on an individual part, entering a serial number associated with the individual part into the CRL;
   for a compromise of all parts because of a firmware vulnerability, entering a serial number associated with the firmware in the CRL; and
   for compromise of all parts due to a hardware vulnerability, entering a producing issuing certificate authority into the CRL.

4. The system of claim 3, wherein credentials for the system include credentials issued for multiple levels.

5. The system of claim 4, wherein the multiple levels include:

read-only memory CA (Certificate Authority) credentials;
kernel CA credentials;
application credentials; and
leaf credentials.

6. The system of claim 5, wherein the multiple levels further include:
root CA credentials;
product type credentials; and
product generation credentials.

7. The system of claim 1, wherein the one or more processors are further to perform corrective action on the firmware.

8. The system of claim 1, wherein credentials for the system are in compliance with a public key infrastructure (PKI) built upon X.509 and RFC5280 standards for public key certificates.

9. The system of claim 1, wherein the ROM CA private key is not exposed outside of the ROM.

10. One or more non-transitory computer-readable storage mediums having stored thereon executable computer program instructions that, when executed by one or more processors, cause the one or more processors to perform operations comprising:
determining that firmware TCB (trusted computing base) of a computing system is compromised and that a hardware RoT (root of trust) of the computing system is intact, wherein credentials for the firmware include one or more certificates and one or more keys, and wherein the hardware RoT includes:
fuses to establish original credentials of the computing system, the original credentials including a chipset key and a certificate issued by a vendor certificate authority (CA), and
a read-only memory (ROM) to derive a ROM CA private key based at least in part on the chipset key and to derive a public key based at least in part on the ROM CA private key;
issuing new credentials by the hardware RoT of the computing system to the firmware of the computing system, wherein issuing the new credentials for the firmware includes setting a serial number of a firmware certificate to include an application ID of the firmware and a version number or security version number (SVN) of the firmware; and
revoking one or more old versions of the credentials for the firmware;
wherein the hardware RoT serves as an on-die certificate authority (ODCA), the hardware RoT to issue the new credentials for the firmware without utilizing a connection to a backend server of the vendor.

11. The storage mediums of claim 10, wherein revoking the one or more old versions of the credentials for the firmware include entering the one or more old versions into a credential revocation list (CRL).

12. The storage mediums of claim 11, wherein entering the one or more old versions into the CRL includes one of:
for compromise of a private key of a certificate on an individual part, entering a serial number associated with the individual part into the CRL;
for a compromise of all parts because of a firmware vulnerability, entering a serial number associated with the firmware in the CRL; and
for compromise of all parts due to a hardware vulnerability, entering a producing issuing certificate authority into the CRL.

13. The storage mediums of claim 12, wherein credentials for the system include credentials issued for multiple levels.

14. The storage mediums of claim 10, wherein the instructions further include instructions for:
performing corrective action on the firmware.

15. A method comprising:
determining that firmware TCB (trusted computing base) of a computing system is compromised and that a hardware RoT (root of trust) of the computing system is intact wherein credentials for the firmware include one or more certificates and one or more keys, and wherein the hardware RoT includes:
fuses to establish original credentials of the computing system, the original credentials including a chipset key and a certificate issued by a vendor certificate authority (CA), and
a read-only memory (ROM) to derive a ROM CA private key based at least in part on the chipset key and to derive a public key based at least in part on the ROM CA private key;
issuing new credentials by the hardware RoT of the computing system to the firmware of the computing system, wherein issuing the new credentials for the firmware includes setting a serial number of a firmware certificate to include an application ID of the firmware and a version number or security version number (SVN) of firmware; and
revoking one or more old versions of the credentials for the firmware;
wherein the hardware RoT serves as an on-die certificate authority (ODCA), the hardware RoT to issue the new credentials for the firmware without utilizing a connection to a backend server of the vendor.

16. The method of claim 15, wherein revoking the one or more old versions of the credentials for the firmware include entering the one or more old versions into a credential revocation list (CRL).

17. The method of claim 16, wherein entering the one or more old versions into the CRL includes one of:
for compromise of a private key of a certificate on an individual part, entering a serial number associated with the individual part into the CRL;
for a compromise of all parts because of a firmware vulnerability, entering a serial number associated with the firmware in the CRL; and
for compromise of all parts due to a hardware vulnerability, entering a producing issuing certificate authority into the CRL.

18. The method of claim 16, wherein credentials for the system include credentials issued for multiple levels.

19. The method of claim 15, further comprising:
performing corrective action on the firmware.

20. An apparatus comprising:
one or more processors to process data;
one or more memory devices for storage of data for processing; and
an embedded system including:
a hardware RoT (root of trust), wherein the hardware RoT includes:
fuses to establish original credentials of the system, the original credentials including a chipset key and a certificate issued by a vendor certificate authority (CA), and
a read-only memory (ROM) to derive a ROM CA private key based at least in part on the chipset key and to derive a public key based at least in part on the ROM CA private key; and
one or more non-volatile memory devices for storage of firmware including a firmware TCB (trusted computing base), the firmware having credentials including one or more certificates and one or more keys;

wherein the one or more processors are to:

determine that the firmware TCB is compromised and that the hardware RoT is intact;

issue new credentials by the hardware RoT for the firmware, wherein issuing the new credentials for the firmware includes setting a serial number of a firmware certificate to include an application ID of the firmware and a version number or security version number (SVN) of the firmware; and revoke one or more old versions of the credentials for the firmware and wherein the hardware RoT serves as an on-die certificate authority (ODCA), the hardware RoT to issue the new credentials for the firmware without utilizing a connection to a backend server of the vendor.

21. The apparatus of claim 20, wherein revoking one or more old versions of the credentials for the firmware include entering the one or more old versions into a credential revocation list (CRL).

* * * * *